(12) United States Patent
Doppstadt et al.

(10) Patent No.: US 9,616,428 B2
(45) Date of Patent: Apr. 11, 2017

(54) COMMINUTION DEVICE

(75) Inventors: Johann Doppstadt, Velbert (DE); Horst Berger, Calbe (DE)

(73) Assignee: DOPPSTADT FAMILIENHOLDING GMBH, Velbert (DE)

( * ) Notice: Subject to any disclaimer, the term of this patent is extended or adjusted under 35 U.S.C. 154(b) by 249 days.

(21) Appl. No.: 14/235,177

(22) PCT Filed: Jul. 26, 2012

(86) PCT No.: PCT/EP2012/003141
§ 371 (c)(1),
(2), (4) Date: Jan. 27, 2014

(87) PCT Pub. No.: WO2013/013819
PCT Pub. Date: Jan. 31, 2013

(65) Prior Publication Data
US 2014/0166792 A1    Jun. 19, 2014

(30) Foreign Application Priority Data
Jul. 26, 2011    (DE) .................... 20 2011 103 675 U

(51) Int. Cl.
*B02C 13/30*    (2006.01)
*F16H 47/04*    (2006.01)
*F16H 37/08*    (2006.01)

(52) U.S. Cl.
CPC ............ *B02C 13/30* (2013.01); *F16H 47/04* (2013.01); *F16H 2037/088* (2013.01); *F16H 2200/2005* (2013.01)

(58) Field of Classification Search
CPC ......... B02C 25/00; B02C 13/30; F16H 47/04; F16H 2037/088; F16H 2200/2025
USPC ............................................... 241/101.2, 236
See application file for complete search history.

(56) References Cited

FOREIGN PATENT DOCUMENTS

| DE | 3406646 U1 | 6/1984 |
|---|---|---|
| DE | 3312663 A1 | 10/1984 |
| DE | 3426083 C1 | 10/1985 |
| DE | 3640146 A1 | 6/1988 |
| DE | 4140549 A1 | 6/1993 |
| DE | 102005037668 A1 | 2/2007 |
| DE | 102007017755 A1 | 10/2008 |

*Primary Examiner* — Mark Rosenbaum
(74) *Attorney, Agent, or Firm* — Jacobson Holman, PLLC.

(57) ABSTRACT

The invention refers to a comminution device, such as for example a shredder (II) or the like for in particular large-size materials, with a main drive (I) generating a rotational movement for a shredder shaft (2), wherein the rotational speed of the shredder shaft (2) can be changed continuously by means of a gear interposed between main drive (I) and shredder (II), wherein as gear a planetary gear, in particular a planetary superposition gear (1), preferably a hydrostatic superposition gear is provided.

Figure 1B:
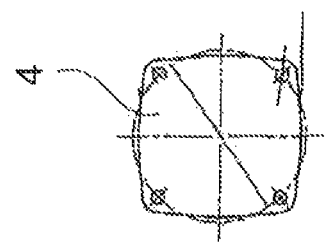

The invention is characterized in that the hydraulic engine (4) as additional drive aggregate can be impinged in two different rotational directions.

21 Claims, 2 Drawing Sheets

COMMINUTION DEVICE

This is a national stage of PCT/EP12/003141 filed Jul. 26, 2012 and published in German, which has a priority of German no 20 2011 103 675.1 filed Jul. 26, 2011, hereby incorporated by reference.

The invention refers to a comminution device, such as for example a shredder or the like for comminuting in particular large-size materials.

Comminution devices of this kind have, as a rule, a main drive generating a rotational movement for a shredder shaft with comminution tools interacting with counter tools. The comminution tools interact with cutting tools or counter comminution tools arranged at the housing or counter tool carriers.

The rotational speed of the shredder shaft can be changed either via the control of the main drive or an interposed gear. A continuous change is possible, as a rule, only with special electric motors, such as for example thyristor motors. When interposing suitable gears so far a control is only possible in certain switching steps. It may become necessary then to interpose a clutch to prevent malfunctions or high wear from occurring at the transmission gear. This increases the risk of malfunctions and in particular the cost of manufacture of the comminution device.

When comminuting large-size materials, such as for example wood waste or the like, there is often the problem of the load of the comminution device becoming so high that the main drive of the comminution device is not able to perform its comminution task, and is either disengaged from the comminution device by a suitable clutch, or destroying or damaging of the comminution device is avoided by a friction clutch. Often it is desirable, when material to be comminuted is clogged, to make a return possible what can be realized only with problems when employing electric or diesel motors. Therefore, the clogging leading to a blocking and/or standstill of the comminution device has to be removed by hand. Of course, for safety reasons, the main drive has to be switched off. Suitable electric motors, for example, cannot be employed everywhere as there is no electric power at places where the comminution device is employed according to its purpose. For this reason, combustion engines, such as for example diesel engines, are used mainly. From the citations DE 34 26 083 C1 and DE 10 2005 037 668 B4 solutions are known according to the preamble of claim 1.

Referring to this state of the art, it is a problem of the invention to suggest a comminution device that does not have anymore the disadvantages described in the state of the art, and that can be manufactured more economically.

The problem of the invention is solved by a comminution device, such as for example a shredder or the like, for in particular large-size materials, with a main drive generating a rotational movement for a shredder shaft with comminuting tools, wherein the rotational speed of the shredder shaft can be changed by means of a gear interposed between main drive and shredder, wherein as gear a planetary gear, in particular a planetary superposition gear, preferably a hydrostatic superposition gear is provided, that is characterized in that the hydraulic engine as additional drive aggregate can be impinged in two different rotational directions. This configuration makes it now possible to achieve without any problems even without a main drive controlled by the rotational speed a change of the rotational speed. In particular, a return movement of the shredder shaft can such be generated without requiring a switching in the form of a suitable special gear transmission, or generating this return movement by reversing the poles, for example of an electric motor what requires switching it off beforehand. With diesel engines and/or combustion engines such a reversal of the rotational movement is not possible at all in the state of the art. It is rather necessary to switch off here the main drive, when clogging or jamming of material to be comminuted occurs in the comminution device, and then to remove it manually. Besides the standstill times, that are now avoided by the solution according to the invention, now the safety and health of workers is improved altogether. By avoiding a possible standstill of the comminution device and the option of reversing the rotational direction it is now possible to remove clogging and/or jamming now by the reverse running of the comminution device, that means a change of the rotational direction of the shredder shaft. Another advantage of the solution configured such is the fact that the gear of the comminution device can also be employed as startup control gear by running and/or setting the planetary superposition gear and/or hydrostatic superposition gear as startup control gear. Accordingly, now the main drive can also be started under load without resulting in an interfering at the comminution device itself, as by a clever solution according to the invention an automatic control of the shredder shaft of the comminution device is achieved.

Accordingly, the invention is characterized in that the hydraulic engine as additional drive aggregate can be impinged in two different rotational directions. This can be reached by switching the rotational and/or flow direction of the hydraulic pump feeding the hydraulic engine, or by providing a suitable switching valve with the necessary ducts, such as for example a three-way valve or the like in order to achieve here a switching of the hydraulic flow, and thus the supply of the hydraulic engine.

As already mentioned, it is another aspect of the invention that as main drive a combustion engine, preferably a diesel engine, but also an electric motor or the like is provided. This main drive provides power of 130 to 500 kW for the comminution device according to the invention. Preferably here a performance of 350 is provided, and a rotational speed of 1,500 to 2,000 rotations per minute is reached.

According to an advantageous configuration, the invention is characterized in that the main drive shows a constant rotational speed. Of course, it is also possible to employ a main drive with continuous control for the comminution device according to the invention. A thyristor motor is here preferred, for example. However, as the field of application of electric motors is restricted regarding the location of the comminution device, as a rule a combustion engine, in particular preferably a diesel engine is employed the rotational speed of which cannot be regulated.

According to a preferred embodiment, the invention is characterized in that an additional drive aggregate, such as for example a hydraulic engine, is provided for a superposition branch of the superposition gear at the planetary superposition gear. This hydraulic engine is fed by a hydraulic pump conveying hydraulic oil as drive medium for example to the hydraulic engine. Accordingly, the drive for the comminution device according to the invention comprises altogether, firstly a main drive, secondly a hydraulic engine for the superposition branch of the superposition gear, and thirdly a hydraulic pump for feeding the hydraulic engine.

Furthermore, the invention is characterized in that the superposition branch of the planetary superposition gear comprises a ring gear in which the additional aggregate, namely the hydraulic engine, engages. According to the invention, this ring gear interacts with at least one planet gear acting on a central gear of the planetary superposition gear. The fact that a hydraulic pump feeds as additional aggregate the hydraulic engine interacting with the main drive of the comminution device, makes it possible to reach the already described advantages of the invention. The way of configuration makes it possible to control the planetary superposition gear and/or the hydrostatic superposition gear continuously. The clever way of arranging hydraulic pump, hydraulic engine, and main drive makes it additionally possible to reach the intended automatic control effect, namely that by controlling the rotational speed of the hydraulic engine the rotational speed of the drive shaft for the comminution device can be controlled continuously altogether. Furthermore, the rotational direction can be reversed with this arrangement. This is in particular regulated by the control of the hydraulic flow of the drive medium of the hydraulic engine. It is, for example, possible, to reverse the rotational direction of the hydraulic engine in order to reach also a reversed rotational direction of the shredder shaft without changing the main drive in any way. These are advantages according to the invention that have not been known in this way in the state of the art.

Furthermore, the invention is characterized in that the rotational speed and/or the rotational direction of the hydraulic engine as additional drive aggregate can be controlled continuously in particular by increasing or reducing the liquid flow of the drive medium. This can be achieved by increasing or reducing the gear ratio of the drive of the hydraulic pump. However, this can also be achieved by providing a separate drive for the hydraulic pump that can be influenced accordingly.

Another aspect of the solution according to the invention is the fact that the hydraulic pump is driven by the main drive, or a separate pump drive is provided for the hydraulic pump. This has already been mentioned. However, the invention is not restricted to a single embodiment, but comprises all described options, and this is coordinated equally.

According to another aspect of the invention, the comminution device according to the invention is characterized in that the rotational speed and/or the rotational direction of the hydraulic engine as additional drive aggregate changes because of the load of the comminution device, for example the shredder, and the rotational speed of the comminution device is automatically controlled depending on the intended comminution performance.

Clever arrangement of the comminution device according to the invention and/or its components make it possible to configure and arrange the hydraulic engine such that it reacts through the increasing or reducing of the pressure of the drive medium on changes of the torque when the load of the comminution device, for example shredder, changes.

The device according to the invention is also characterized in that the rotational direction of the comminution device can be changed, in particular reversed, through the different impingement of the hydraulic engine. This is carried out, for example, by switching the hydraulic liquid supply or by reversing the rotational direction of the pump drive.

Furthermore, it has been found according to the invention to be an advantage when an overload protection is provided monitoring the pressure of the drive medium and opening at a chosen overpressure. This overpressure is set in the preferred embodiment of the comminution device according to the invention to about 400 bar.

Furthermore, it is another aspect of the comminution device according to the invention that the planetary superposition gear and/or the hydrostatic superposition gear are provided as startup control gear, in particular for the startup of the main drive under load. This configuration makes it possible, even under load, to start the entire comminution device without the requirement of removing the still to be comminuted material from the comminution device. This is in particular an advantage after a malfunction has been eliminated. This has also the advantage altogether that the comminution device is exposed to less wear than solutions of the state of the art.

Figure 1A:
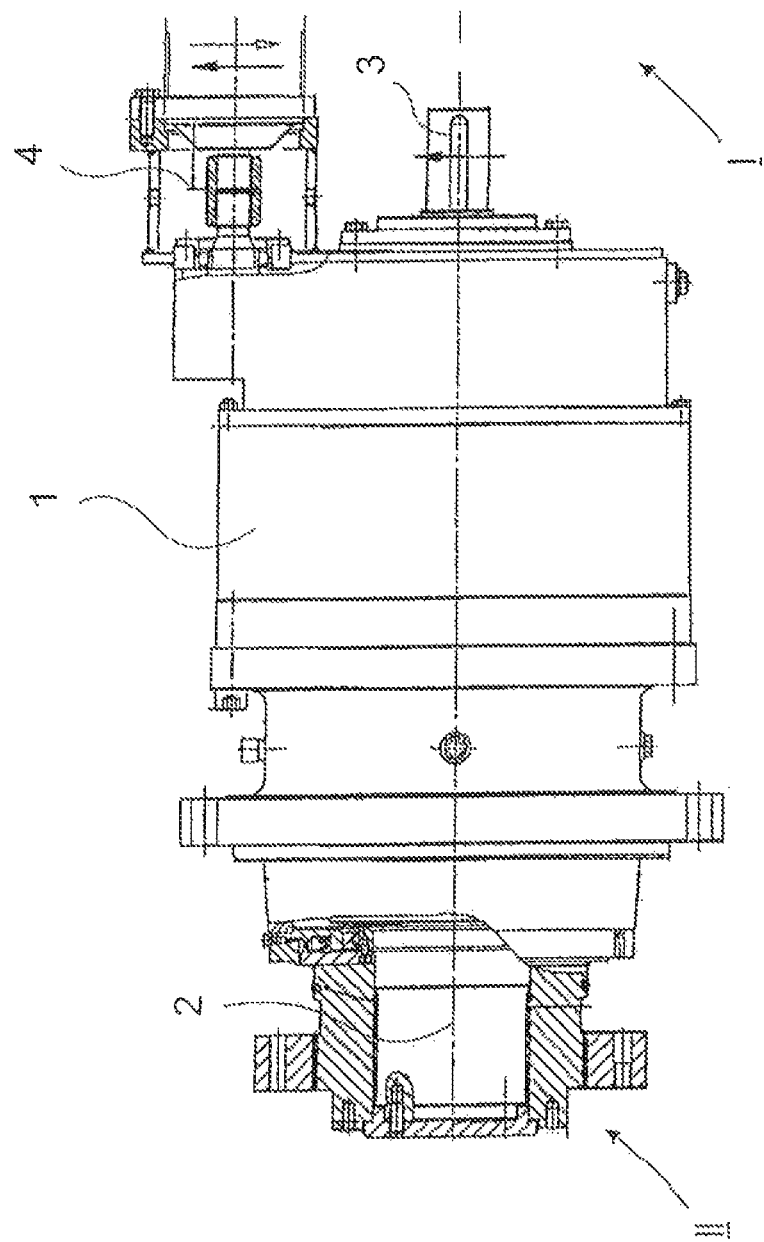
Figure 2:
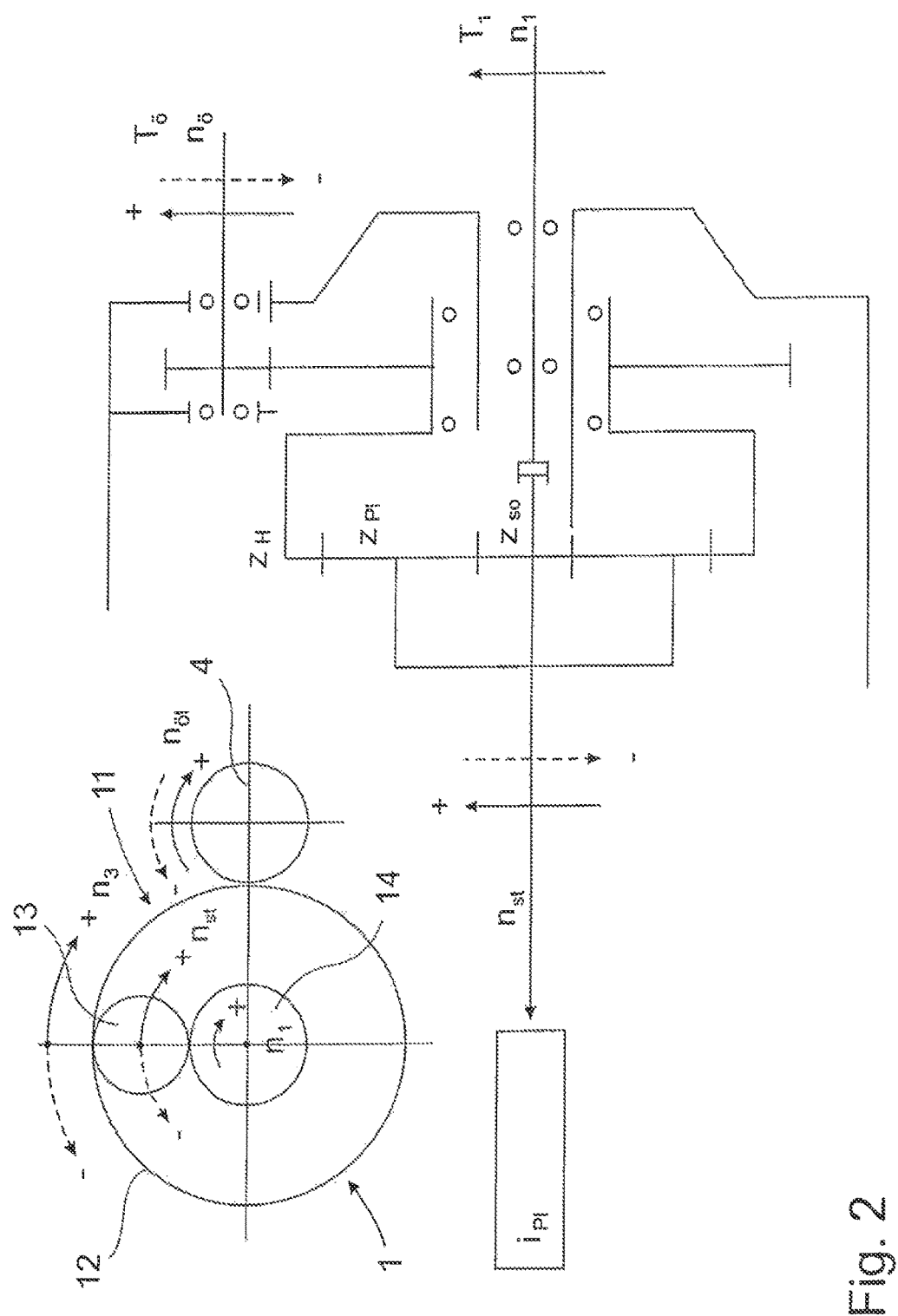

In the following, the invention is described further by means of examples. In the figures:

FIGS. 1a and 1b Embodiment of a part of the comminution device according to the invention, FIG. 2 Schematic representation of the superposition gear for the comminution device according to the invention.

FIGS. 1a and 1b show an embodiment of a part of the comminution device according to the invention, namely here a gear with hydraulic engine as well as the suitable shaft connections for connecting the main drive and the connection for the comminution device itself.

Gear 1 is here, for example, a planetary superposition gear which is preferably a hydrostatic superposition gear. Reference number 3 indicates the shaft for connecting the main drive I. This is indicated only schematically by reference number I and an arrow. On the other side of the gear 1 there is a shredder shaft 2 serving for connecting a not-shown shredder II. This shredder II is indicated, also only schematically, with reference number II and an arrow. As it can be seen, on the right hand side of the view of FIG. 1a a hydraulic engine 4 is provided that can be seen in FIG. 1b only once in a front view.

The construction of the gear for the comminution device according to the invention can be seen essentially in FIG. 2. FIG. 2 shows a graphic representation of an embodiment for the gear of the comminution device according to the invention. This is a normal graphic representation usual for gears. Reference number 1 again indicates the planetary superposition gear. This comprises (see FIG. 2, left hand side above) a superposition branch 11. The additional drive aggregate, here a hydraulic engine 4, engages in this superposition branch 11. The hydraulic engine 4 is fed by a hydraulic pump, not shown here, with the suitable drive medium, such as, for example, hydraulic oil. The superposition branch 11 of the planetary superposition gear 1 further comprises a ring gear 12 also shown schematically by a circle. The ring gear 12 interacts with a planet gear 13, which again acts on a central gear 14. Of course, it is also possible to employ several planet gears, as usual with planetary gears. However, for a schematic representation one planet gear 13 is sufficient here. The dashed arrows and/or continuous arrows at the ring gear 12, indicated by plus and minus, indicate the rotational speed of the ring gear 12.

The arrows, dashed and/or continuous, at the hydraulic engine 4 indicate the rotational speed of the hydraulic motor containing additionally the denomination $n_{öI}$. Furthermore, plus and minus and $n_I$ indicate the range of the rotational speed of the step, in this case the first step. $n_1$ refers to the rotational speed of the center gear. In the graphic representation, the capital letters $Z_H$ indicate ring gear, $Z_{PL}$ planet gear, and further below and/or in the center axis $Z_{SO}$ sun gear. On the right hand side, $T_1$ indicates the torque of the main drive I, while below the rotational speed of the main drive is shown or indicated. $T_{öI}$ and $n_{öI}$ indicate, on the one hand, the torque of the hydraulic motor, and, on the other hand, the rotational speed of the oil engine. The rotational speed of the first step is also indicated at the arrow in direction $i_{PI}$. As it can be seen, this can be found in plus as well as in the minus area. $i_{PL}$ also indicates that here several more steps of a planetary gear can be connected in series so that here even more favorable transmission ratios/torques can be achieved. What is not shown in the figures is the embodiment described further above whereupon a hydraulic pump is driven by the main drive I for feeding the hydraulic engine 4. The way of function of the comminution device according to the invention has been described sufficiently further above so that here a new presentation is not necessary.

The invention has been described before by means of examples. The claims filed now and later on along with the application are attempted formulations without prejudice for obtaining a broader protection.

References in the depending claims refer to the further configuration of the subject matter of the main claim by means of the characteristics of the respective sub-claim. However, these are not to be understood as a waiver for obtaining an independent subjective protection for the characteristics of the referred sub-claims.

Characteristics, so far only disclosed in the description, can be claimed in the course of proceedings as being of essentially inventive relevance, for example to distinguish from the state of the art.

The invention claimed is:

1. A comminution device for large-size materials, with a main drive generating a rotational movement for a shredder shaft, wherein rotational speed of the shredder shaft can be changed continuously by means of a planetary gear interposed between the main drive and a shredder, wherein a hydraulic engine can be impinged as an additional drive aggregate in two different rotational directions to achieve a change of the rotational speed and a return movement of the shredder shaft can be generated.

2. The comminution device according to claim 1, wherein the main drive is a combustion engine with a performance of 130 to 500 kW and a rotational speed of 1,500 to 2,000 rotations per minute.

3. The comminution device according to claim 2, wherein the combustion engine is a diesel engine.

4. The comminution device according to claim 2, wherein the combustion engine has a performance of 315 kW.

5. The comminution device according to claim 1, wherein the main drive has a constant rotational speed.

6. The comminution device according to claim 1, wherein that the rotational speed of the main drive can be controlled.

7. The comminution device according to claim 6, wherein the rotational speed of the main drive can be controlled continuously.

8. The comminution device according to claim 1, wherein the planetary gear is a planetary superposition gear and the additional drive aggregate is provided for a superposition branch of a superposition gear at the planetary superposition gear.

9. The comminution device according to claim 8, wherein the superposition branch of the planetary superposition gear comprises a ring gear in which the additional drive aggregate engages.

10. The comminution device according to claim 8, wherein the superposition branch of the planetary superposition gear comprises a ring gear in which the additional drive aggregate engages and the ring gear interacts with at least one planetary wheel which again acts on a central wheel.

11. The comminution device according to claim 1, wherein a hydraulic pump is provided for providing the hydraulic engine with a drive medium.

12. The comminution device according to claim 1, wherein the rotational speed and/or the rotational direction of the hydraulic engine as additional drive aggregate can be controlled continuously by increasing or reducing the liquid flow of the drive medium.

13. The comminution device according to claim 1, wherein a hydraulic pump is driven by the main drive, or the hydraulic pump has its own pump drive.

14. The comminution device according to claim 1, wherein the rotational speed and/or the rotational direction of the hydraulic engine as additional drive aggregate changes because of the load of the comminution device, and the rotational speed of the comminution device controls itself depending on the required comminution performance.

15. The comminution device according to claim 1, wherein the hydraulic engine is configured and arranged such that it reacts by increasing or reduction of the pressure of the drive medium on changes of the torque when the load of the comminution device changes.

16. The comminution device according to claim 1, wherein the rotational direction of the comminution device can be changed by the different impingement of the hydraulic engine.

17. The comminution device according to claim 1, wherein an overload protection is provided monitoring the pressure of the drive medium and opening at a selected over pressure, wherein this over pressure is about 400 bar.

18. The comminution device according to claim 1, wherein the planetary superposition gear and/or the hydrostatic superposition gear is/are provided as startup control gear for the startup of the main drive under load.

19. The comminution device according to claim 1, wherein the planetary gear is a planetary superposition gear.

20. The comminution device according to claim 1, wherein the planetary gear is a hydraulic superposition gear.

21. The comminution device according to claim 1, wherein the main drive is an electric motor.

* * * * *